Figure 1:
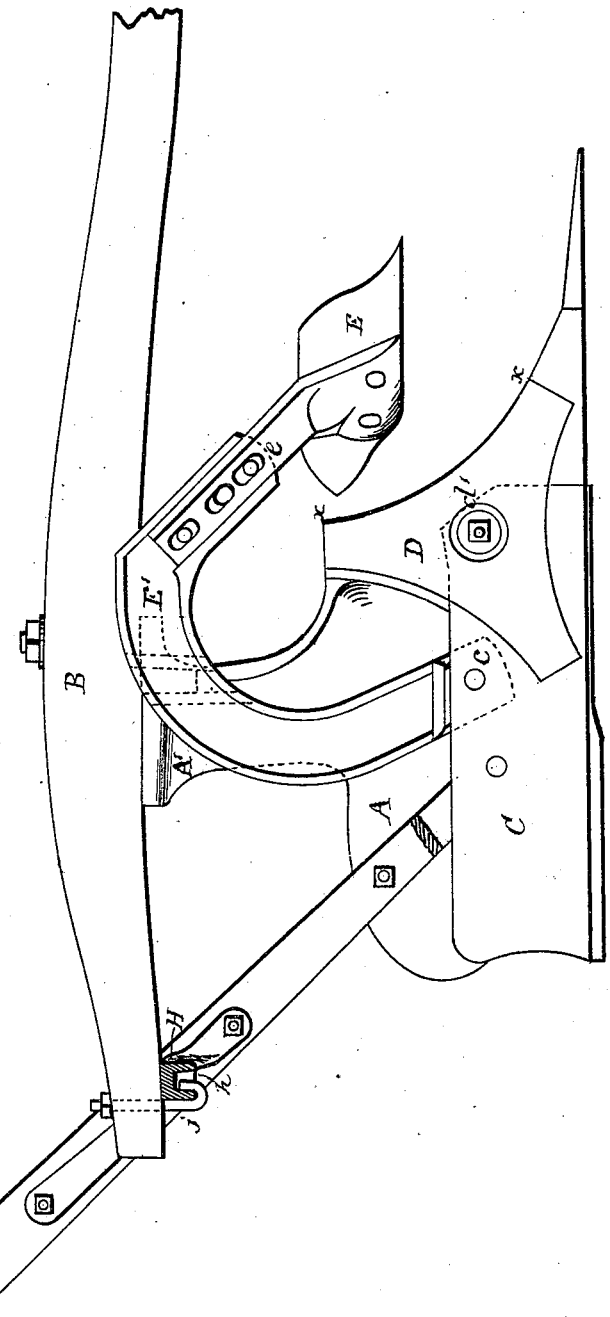

3 Sheets—Sheet 1.

J. W. KLINELINE.
Plow.

No. 215,634. Patented May 20, 1879.

WITNESSES
Robert Everett
Vinton Coombs

INVENTOR
J. W. Klineline
J. J. Coombs,
By
ATTORNEYS.

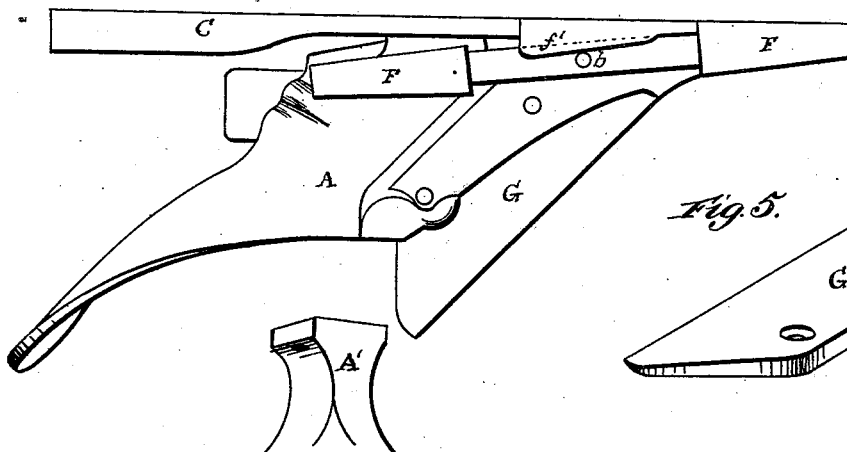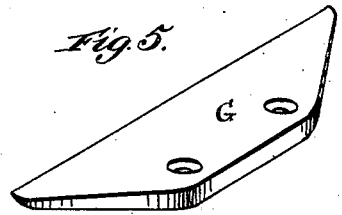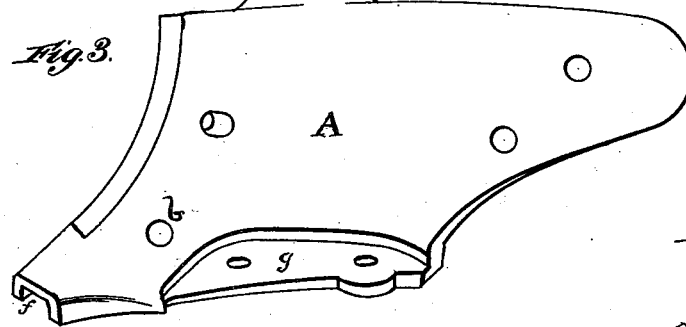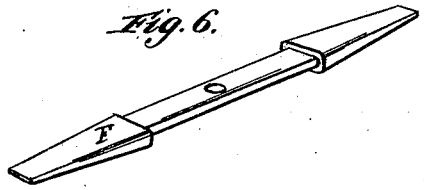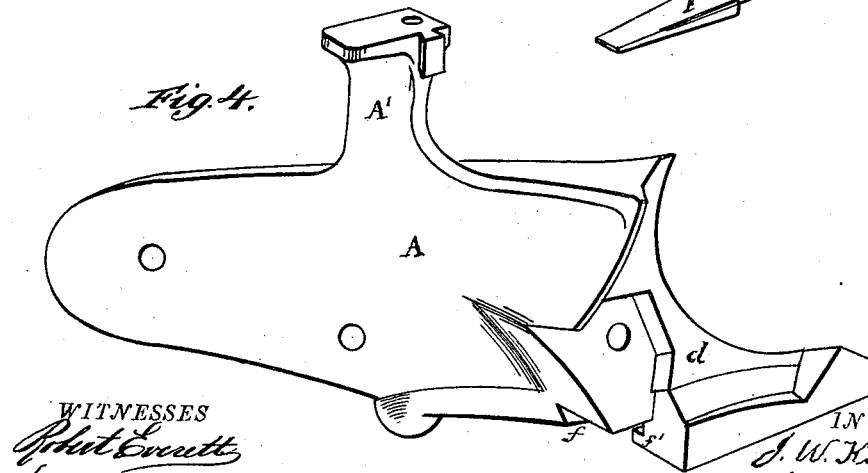

3 Sheets—Sheet 3.
J. W. KLINELINE.
Plow.
No. 215,634. Patented May 20, 1879.
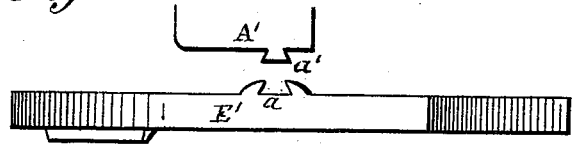
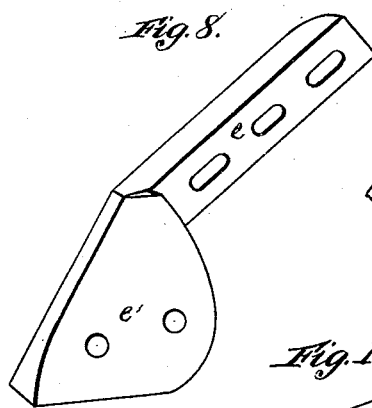
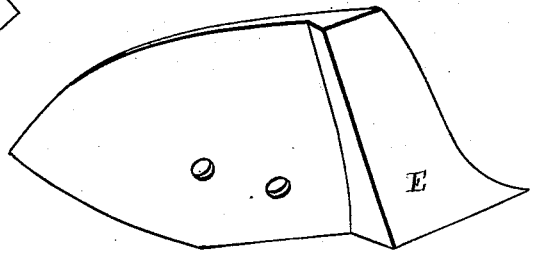
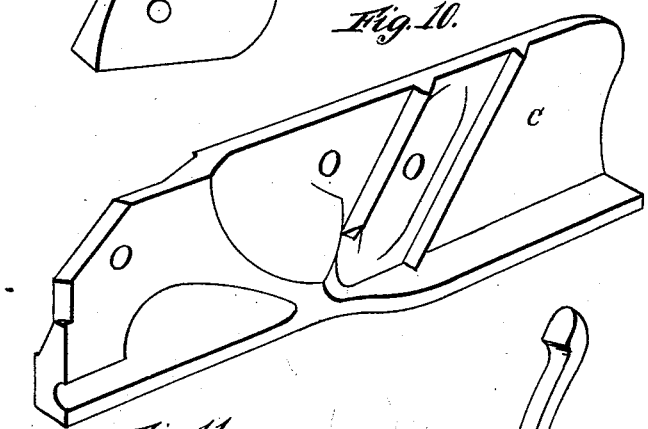
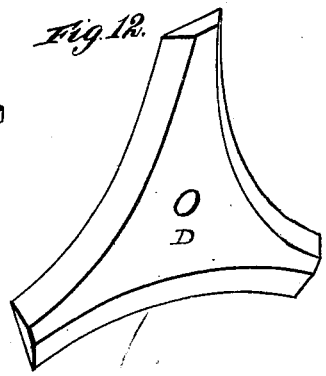
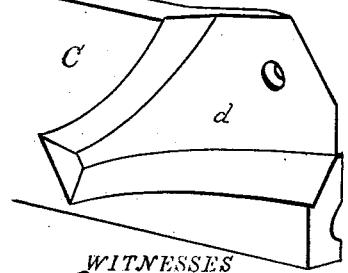
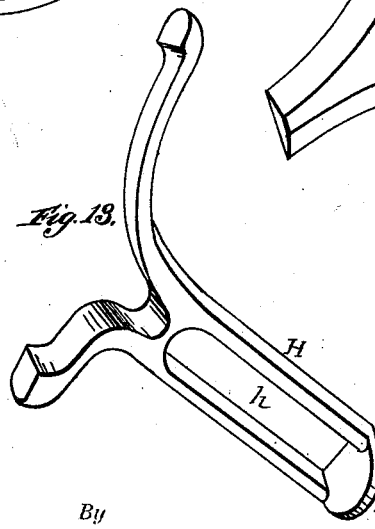
WITNESSES
INVENTOR
J. W. Klineline
J. J. Coombs,
ATTORNEY

UNITED STATES PATENT OFFICE.

JOHN W. KLINELINE, OF MIDDLETOWN, PENNSYLVANIA.

IMPROVEMENT IN PLOWS.

Specification forming part of Letters Patent No. 215,634, dated May 20, 1879; application filed April 3, 1879.

*To all whom it may concern:*

Be it known that I, JOHN W. KLINELINE, of Middletown, in the county of Dauphin and State of Pennsylvania, have invented certain new and useful Improvements in Plows, of which the following is a specification.

My invention consists, first, in the combination of a three-sided reversible cutter of peculiar form with the mold-board and land-side; and, second, in an improved mode of attaching a sod-cutter to the plow.

In the accompanying drawings, Figure 1 represents a side elevation of the plow with the handle on the land-side removed and the cross-bar between the handles shown in cross-section. Fig. 2 is a view of the bottom of the plow reversed, showing the mold-board, the reversible point, reversible share, and land-side. Fig. 3 is a view of the outer side of the mold-board and standard, cast together, showing the groove for the reversible point in the lower front part of the mold-board, the seat for the reversible share, and the beveled edge of the reversible cutter. Fig. 4 is a view of the inner side of the mold-board and standard, showing a portion of the seat of the reversible cutter and the bolt-hole through which it is bolted to the mold-board. Fig. 5 is a view of the reversible share detached. Fig. 6 is a view of the reversible point detached. Fig. 7 is a view of the upper part of the curved bar which carries the sod-cutter and of the part of the standard to which it is attached by a dovetail fastening shown therein. Fig. 8 is a view of the adjustable bar to which the sod-cutter is to be bolted detached from the curved bar shown in Fig. 1. Fig. 9 is a view of the inner side of the sod-cutter mold-board detached from its seat, shown in Fig. 8. Fig. 10 is a view of the inner side of the land-side. Fig. 11 is an outside view of the forward end of the inner side of the land-side, showing a portion of the seat for the reversible cutter. Fig. 12 is a view of the inner side of the reversible cutter. Fig. 13 is a view of the under side of the cross-bar between the handles, which supports the rear end of the beam.

The same letters refer to the same parts in all the figures.

A is the mold-board; B, the beam; C, the land-side; D, the three-sided reversible cutter, and $d$ the seat of the same, partly in the mold-board and partly in the land-side. E is sod-cutter; $e$, a bar by which the same is adjustably attached to the curved bar E'. F is the four-way reversible point, and $f$ a groove in the lower side of the mold-board, in which the same is secured. G is the reversible share, and $g$ is the seat in the mold-board into which the same fits. H is the cross-bar between the handles, which supports the rear end of the beam, and $h$ a groove in the lower side thereof, with which a hook, $i$, on the end of a screw-bolt passing through the rear end of the beam, engages.

The metal portion of the plow, with the exception of the reversible point, which is made of wrought-iron or steel, and the bolts and rivets, is designed to be made of cast-iron, though the reversible cutter and share may, both or either of them, be made of wrought-iron or steel, if desired.

The reversible cutter D has three curved sides precisely alike, each of said curved sides having a sharp cutting-edge, so that when secured in its seat, with either side in front, it will form a cutting-edge with a regular curve from $x$ to $x$, Fig. 1, corresponding with the curve of the mold-board, and forming no angle therewith to catch and hold dirt. This cutter has its seat $d$ partly in the mold-board and partly in the land-side, and is secured to them by a single screw-bolt, $d'$, passing through both.

The mold-board is so cast as to form a groove, $f$, in its lower front portion, into which the reversible point F fits, and has a lip, $f'$, extending partly over the shank of the reversible point, as shown in Fig. 2. The reversible point is secured in this groove by a single bolt passing through the center of its shank and the mold-board at $b$. Said reversible point is made of wrought-iron or steel. When one end is too much worn for use, it is turned end for end, and may be turned upside down; and when both ends are worn out it may be readily replaced by a new one.

The reversible share G has its two ends and upper and lower sides precisely alike, and is secured by bolts in its seat $g$ on the upper side of the lower portion of the mold-board. It may be readily turned end for end and upside down, or replaced by a new one.

The sod-cutter mold-board E is secured to its seat $e'$ on the lower end of an adjustable bar, $e$, which bar is adjustably secured to the curved bar E′ by means of a bolt or bolts passing through slots. The said curved bar E′ is secured to the plow by means of a dovetail recess, $a$, engaging with a dovetail lug, $a'$, on the upper end of the standard A′, as shown in Fig. 7, and by a screw-bolt securing its rear end to the inner side of the land-side, as shown at $c$. It is easily removed by unscrewing said bolt.

The beam is made adjustable laterally by being so bolted on the top of the standard A′ that it will turn thereon as upon a pivot, and by being movable at its rear end to the right or left on the cross-bar H. It is secured to said cross-bar by means of a hook-bolt, $j$, passing through the beam on the rear of said bar, and engaging with the groove $h$ in the lower side of said bar, as shown in Fig. 1. Said hook-bolt is secured by means of a screw and nut, which renders it easily loosened and tightened to change the adjustment of the beam. It is important that this hook shall engage with the rear side of said cross-bar, as that gives the entire strength of the bar to resist the forward strain of the beam.

What I claim as my invention is—

1. The combination of the three-way reversible cutter, with curved cutting-edges, as described, the mold-board, recessed to fit behind the cutter, and the land-side having the recess $d$, all constructed and fitted together substantially as described.

2. The combination of the sod-cutter, the adjustable bar $e$, and the curved bar E′, the latter being secured to the standard A′ by a dovetail fastening, $a\ a'$, and its rear end bolted to the land-side, substantially as described.

In testimony that I claim the foregoing I have hereunto set my hand in the presence of the subscribing witnesses.

JOHN W. KLINELINE.

Witnesses:
 VINTON COOMBS,
 J. A. RUTHERFORD.